United States Patent [19]

Priest

[11] Patent Number: 4,786,805

[45] Date of Patent: Nov. 22, 1988

[54] REUSABLE RADIOACTIVE MATERIAL SHIPPING CONTAINER INCLUDING CARTRIDGE AND INJECTOR

[75] Inventor: Mark A. Priest, Duncan, Okla.

[73] Assignee: Halliburton Company, Duncan, Okla.

[21] Appl. No.: 919,750

[22] Filed: Oct. 16, 1986

[51] Int. Cl.$^4$ .................................................. G01V 5/00

[52] U.S. Cl. ...................................... 250/260; 222/387

[58] Field of Search ............... 376/272, 260, 261, 310; 250/506.1, 260, 497.1, 496.1, 432 R, 433, 430, 302, 303; 222/387, 497, 496

[56] References Cited

U.S. PATENT DOCUMENTS

| | | | |
|---|---|---|---|
| 1,323,116 | 11/1919 | Stott | 222/387 |
| 1,688,571 | 10/1928 | Zerk | 222/387 |
| 1,692,320 | 11/1928 | Zerk | 222/387 |
| 1,711,777 | 5/1929 | Davis | 222/387 |
| 1,789,536 | 1/1931 | Seghers | 222/387 |
| 3,010,023 | 11/1961 | Egan et al. | 250/260 |
| 3,493,757 | 2/1970 | Glenn, Jr. | 250/260 |
| 3,766,388 | 10/1973 | Greaney | 250/260 |
| 3,838,289 | 9/1974 | White | 250/506.1 |
| 4,199,680 | 4/1980 | Moon | 250/260 |
| 4,200,804 | 4/1980 | Farella et al. | 250/432 R |
| 4,421,982 | 12/1983 | Potter et al. | 250/260 |
| 4,493,813 | 1/1985 | Loriot et al. | 376/409 |
| 4,574,880 | 3/1986 | Handke | 250/260 |
| 4,659,925 | 4/1987 | Burbidge et al. | 250/260 |
| 4,712,618 | 12/1987 | Handke et al. | 250/260 |

*Primary Examiner*—Deborah L. Kyle
*Assistant Examiner*—Daniel Wasil
*Attorney, Agent, or Firm*—James R. Duzan; E. Harrison Gilbert, III

[57] ABSTRACT

A container for holding a radioactive substance to be injected directly into a flow stream includes a cartridge portion, defined by a receptacle member having a cavity in which the substance is to be carried and a channel through which the substance is to be injected into the flow stream, and an injector portion, defined by a plunger member retained within the cavity of the receptacle member. One or more end closure members can be connected, such as by clamps, to one or more respective ends of the receptacle body. In certain embodiments a valve is disposed in the channel of the receptacle member.

9 Claims, 9 Drawing Sheets

REUSABLE RADIOACTIVE MATERIAL SHIPPING CONTAINER INCLUDING CARTRIDGE AND INJECTOR

BACKGROUND OF THE INVENTION

This invention relates generally to a container for a radioactive substance and more particularly, but not by way of limitation, to a container for connecting to a flow line extending between a blending tub and a well head.

Throughout an oil or natural gas well's life, there may be the need to "tag" a particular operation with one or more liquefied or slurried radioactive tracer sources. These operations include fracturing, acidizing, cementing and others known to the art. One particular type of tracer source is a proppant, such as sand, coated or otherwise containing a radioactive isotope. Once such a source becomes entrapped or deposited in fractures or voids in the well bore, subsequent gamma ray logging operations can be used to locate where such source is entrapped or deposited, thereby providing information related to how effective the particular operation was.

The use of radioactive sources can create problems in shipping and using the sources. For example, in shipping a radioactive substance, suitable shipping containers meeting governmental regulations must be used. These shipping containers have frequently been of the type requiring manual handling by personnel at a camp site or well site in transferring the radiactive substance from each of the containers to a blending tub or other reservoir used in a method for injecting a radioactive mixture into a well. Such handling can lead to personnel, equipment and environmental exposure to, and contamination by, the radioactivity.

I am aware of three methods for adding a radioactive source to one or more other materials which are to be mixed and conveyed into a well. One of these methods includes manually adding the tracer source, such as from glass bottles, into the mixing tub of a blender unit, a cement unit or other source equipment from which the resultant mixture is ultimately to be pumped into the well. This is likely the easiest method to use; however, it also likely poses the greatest risk of an accident resulting in exposure and contamination to personnel and the environment. Because the mixing tub into which the radioactive substance is poured is at or near the head of the flow stream ultimately moved into the well through suitable conduits and pumps, this is also the method which contaminates the most equipment generally not dedicated solely to use with the radioactive substances.

A second method utilizes a low pressure injector to inject the radioactive tracer source before one or more high pressure pumps used to pump a mixture from a blending unit into a well. Such an injector unit is usually skid-mounted and transported in a utility trailer. This unit typically comprises a diaphgram pump, a reservoir funnel, a metering valve, a visual sight tube, valves, and a length of transfer hose for injecting the tracer source into the flow stream flowing between the blending unit and the high pressure pump. This type of unit may weigh about 400 pounds and cost between $7,000.00 and $10,000.00. Although this unit eliminates contamination of the upstream blending equipment and an upstream portion of the suction line of the high pressure pumps, which upstream components would be contaminated by the first-mentioned method, this second method still requires personnel to manually open the shipping containers and transfer the radioactive isotope to the reservoir funnel. Therefore, there is still a significant risk of human and environmental contamination. Furthermore, the high pressure side of the pumping equipment is still contaminated. The equipment of the injector unit and the transfer hose are also contaminated and thus need to be carefully handled even though they are dedicated to this specific use and are not intended to be used with non-radioactive substances that might thereby by contaminated by residue in the injector unit. Furthermore, the injector unit of this type of method is not designed to transport the radioactive tracer material from location to location. The tracer must be carried in separate containers and transferred to the unit at the well site.

A third method uses a high pressure liquid tracer injection trailer including a dual reservoir tracer container meeting governmental regulations so that it can be used to transport the radioactive source. A particular embodiment of this container is designed to receive a separate container which includes a radioactive material-loaded syringe carried in a protective housing directly connectible to the dual reservoir container. The injection unit of this third method also includes a metering pump, a high pressure metering-dilution pump, and a hose to transfer the tracer source to the well head. Such a trailer can weigh between 3,000 and 3,500 pounds and cost between $25,000.00 and $30,000,00. This unit is designed to inject only a liquid tracer source, not a slurry type of source. Because this unit injects the radioactive material the closest to the well head of the three mentioned methods, this method produces the least contamination of equipment located at the well site. Furthermore, this unit can legally transport the radioactive tracer source; however, loading of the tracer source is still to be conducted by personnel at a field camp (such as by means of the syringe-carrying housing) and not at a central production location where the safest procedures may most likely be observed.

Thus, although the three methods do have respective advantages and the third-mentioned method likely creates the least likelihood for personnel, environmental and equipment contamination, even it still is generally implemented by transferring radioactive substances at locations where the safest handling precautions might not or cannot be observed. Therefore, there is the need for an improved container which overcomes shortcomings of the aforementioned techniques by functioning both as a carrying cartridge in which a radioactive substance can be legally transported and as an injector from which the radioactive substance can be injected directly into the mixture flowing into the well bore in such a manner to reduce the risk of personnel, equipment and environmental exposure and contamination. Such a container should be designed so that it is to be loaded at a central loading facility to obviate any transfers by personnel at a field camp or well site or other location where proper handling procedures may be more likely ignored or impossible to follow. The container should be designed so that its contents can be unloaded directly into the flowing stream of material between a blending tub and a well head to reduce the amount of contaminated equipment and to reduce the risk of exposing or contaminating personnel or the environment. The container should be able to hold and inject a premixed slurry as well as a radioactive source in more fluid form. The container should not require its own pumping equipment or hoses to be operational, thereby reducing the size and cost of the unit. The container should be constructed to meet pertinent governmental regulations for radioactive material shipping containers so that it can be used to transport a radioactive substance from the loading site to the use site. The container should be adaptable to both high and low pressure usage and to usage at various rates of injection. The container should be relatively lightweight and inexpensive and yet be reusable to further enhance its economic aspects.

SUMMARY OF THE INVENTION

The present invention overcomes the above-noted and other shortcomings of the prior art and meets the aforementioned needs by providing a novel and improved resuable radioactive material shipping container including cartridge and injector. The cartridge feature of the invention is preferably to be loaded at a central loading facility to obviate the need to transfer a radioactive substance into the container by personnel at a location which might not be as carefully controlled, such as a field camp or well site. The injector feature of the container permits the radioactive substance to be unloaded directly into a flowing stream of material, such as between a blending tub and a well head. Various types of substances can be contained and injected using the present invention. Examples include a liquid radioisotope or a premixed radioactive slurry. The container is intended to meet pertinent governmental regulations for containing and transporting radioactive material. The container is a self-contained unit which need not be accompanied by, or skid-mounted with, dedicated pumping equipment or hoses. The container can, however, be used in either high or low pressure situations, and it can accommodate various rates of injection. The container is preferably constructed so that it is relatively lightweight and inexpensive, but reusable.

In the particular environment where a radioactive substance is to be injected into a flow line extending between a blending tub and a well head, the container of the present invention comprises receptacle means for holding a radioactive slurry and displacement means, mounted in the receptacle means, for displacing at least a portion of a radioactive slurry from the receptacle means into the flow line when the container is connected to the flow line and a radioactive slurry is in the receptacle means. The receptacle means includes an elongated body having a cavity in which a radioactive slurry is to be held, which body also has a lower end connectible to the flow line. This body includes a channel extending from the cavity, in which channel a valve forming another part of the body is disposed in a preferred embodiment. This displacement means includes a plunger member slidably retained in the cavity of the body. It is contemplated that the present invention has more general utility as will become more apparent in the following description of the preferred embodiments.

From the foregoing, it is a general object of the present invention to provide a novel and improved reusable radioactive material shipping container including cartridge and injector. Other and further objects, features and advantages of the present invention will be readily apparent to those skilled in the art when the following description of the preferred embodiments is read in conjunction with the accompanying drawings.

DETAILED DESCRIPTION OF THE PREFERRED EMBODIMENTS

Figure 1:
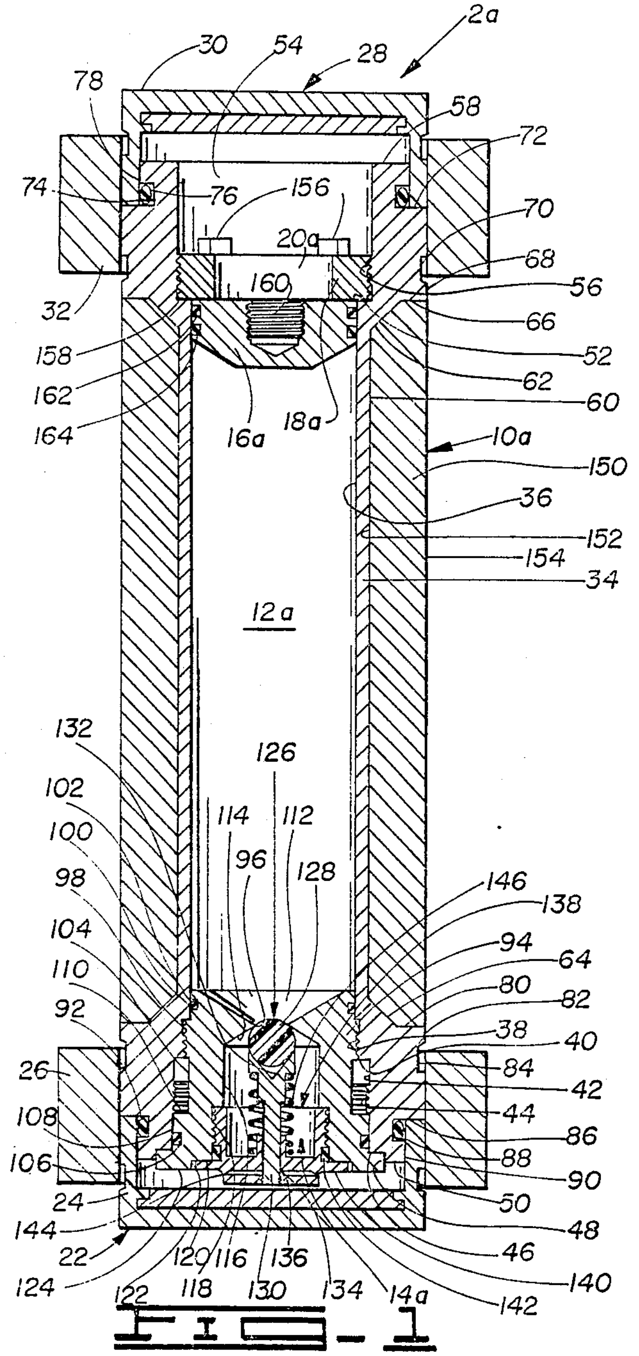
FIG. 1 is a sectional elevational view of a preferred embodiment of the container of the present invention.
Figure 2:
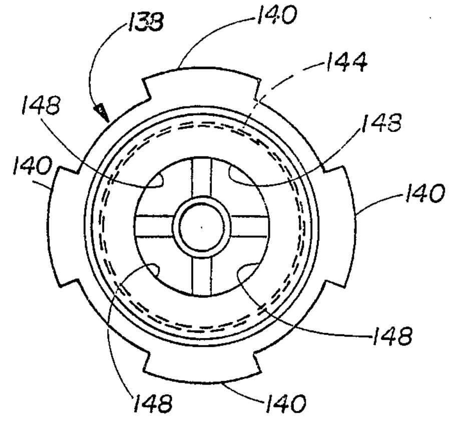
FIG. 2 is a plan view of a ball and spring retainer member of a valve of the embodiment shown in FIG. 1.

In the drawings, the reference numeral 2 generally identifies a container of the present invention. The different embodiments of the container are identified by the reference numeral 2 followed by a respective letter suffix. Because the embodiments have several features in common, these will be described first. Each of these common features will be identified by a respective reference numeral, but in the drawings the numeral will be followed by the appropriate letter for that respective embodiment. Following the description of the several common features, each particular embodiment will be described as to its unique or distinguishing features.

Figure 4:
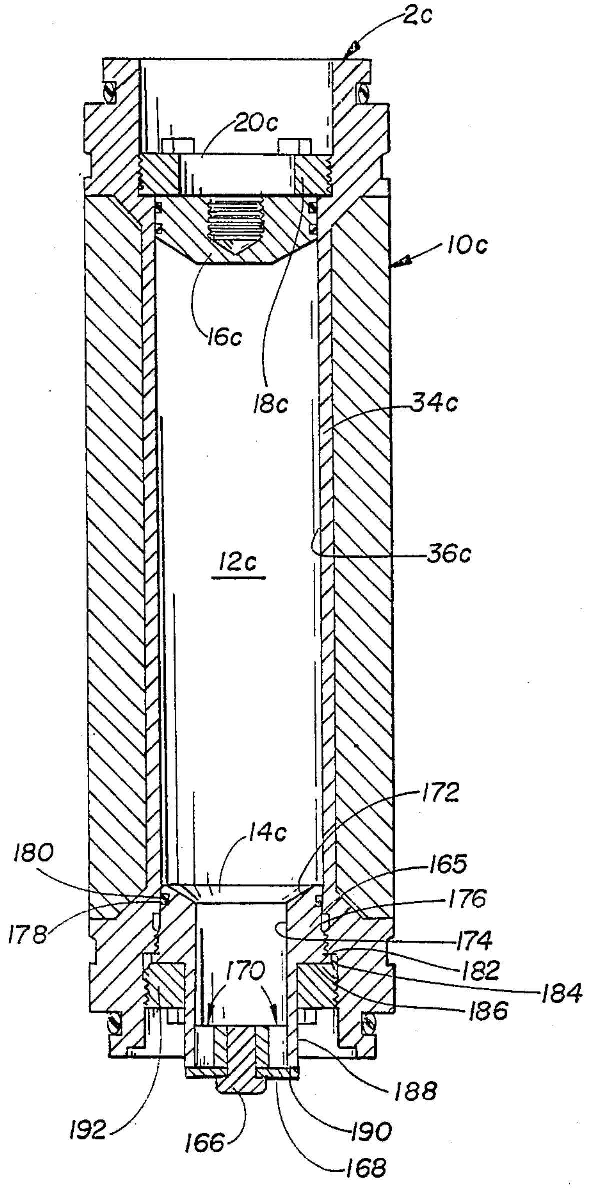
FIG. 4 is a sectional elevational view of a further preferred embodiment of the container of the present invention.
Figure 5:
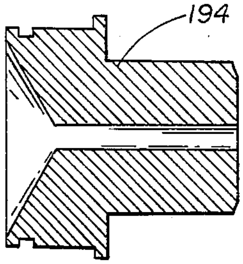
FIG. 5 is a sectional view of another channel member which can be used with the embodiment of the container shown in FIG. 4.
Figure 6:
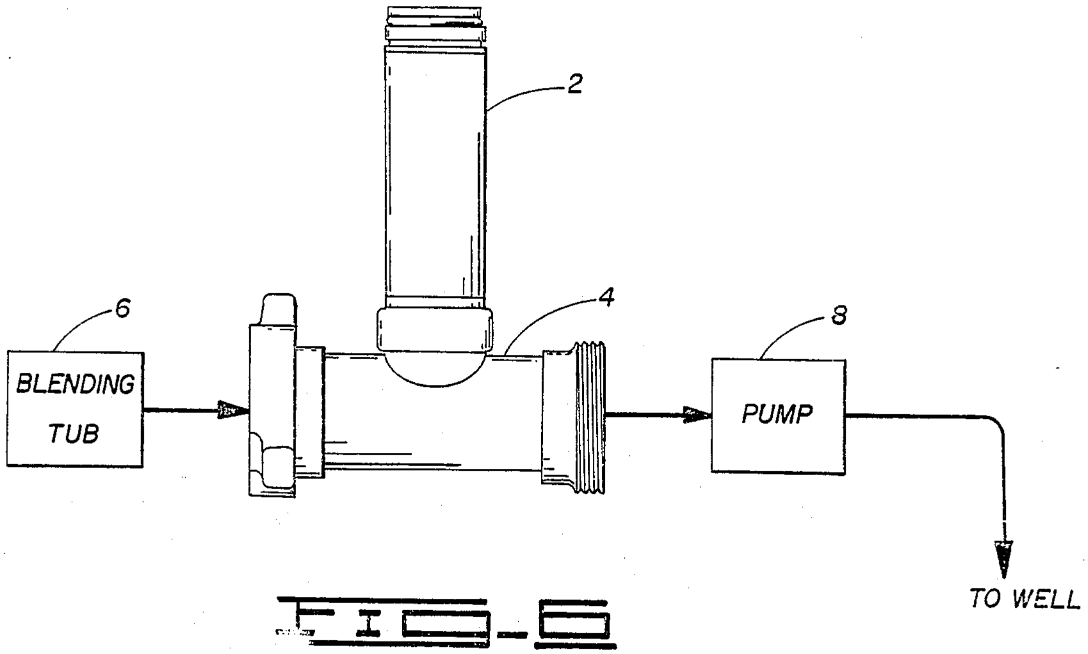
FIG. 6 is a schematic illustration showing a container of the present invention connected to a tee joint forming part of a carrier system for carrying a flow of material from a blending tub to a well head in response to a pump.

Before describing the structures of the embodiments, it is to be noted that the embodiments of FIGS. 1–5 and 10–11 are low pressure (e.g., less than 400 pounds per square inch) embodiments contemplated to be used with a tee connector 4 forming part of a carrier line extending between a blending tub 6 and a well head to which a material, comprising a mixture of materials from the blending tub 6 and a radioactive substance from the container 2, is flowed by a pump 8 as illustrated in FIG. 6. This environment illustrated in FIG. 6 represents how the present invention can be used to radioactively "tag" material in fracturing, acidizing, cementing or otherwise suitably treating an oil or gas well; however, the container 2 can be used in other environments where a radioactive substance needs to be transported and injected into a flow stream. Whereas the embodiments of FIGS. 1–5 and 10–11 are low pressure types, the embodiments shown in FIGS. 7–9 and 12–14 are for high pressure usage in a manner analogous to the overall system illustrated in FIG. 6 or otherwise.

Broadly, each of the embodiments shown in the drawings includes a cartridge portion and an injector portion. Also sometimes included are one or more end closures for capping the ends of the cartridge portion.

Figure 13:
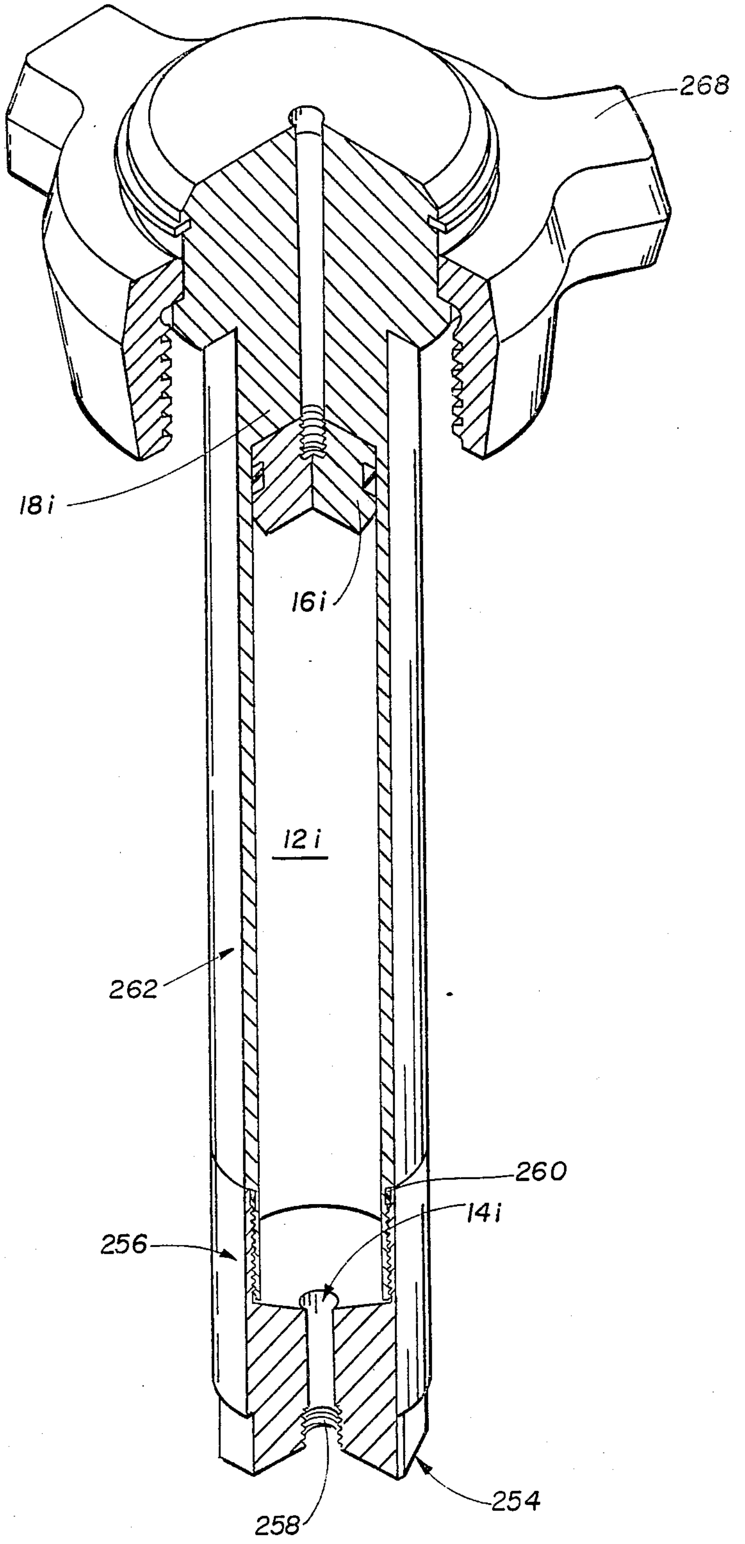
FIG. 13 is a partial sectional perspective view of a preferred embodiment of a reusable cartridge which can be used to form the FIG. 14 embodiment of the container of the present invention.

The cartridge portion includes receptacle means 10 for holding the radioactive substance, such as a liquid radioactive isotope or a viscous radioactive slurry. Each of the receptacle means for the illustrated embodiments is defined by an elongated body including side wall means for defining a single cavity 12 encompassed by a radioactivity barrier. Thus, the body has a radioactivity confining volume defined in it so that a radioactive substance can be protectively held in the body. It is to be noted that each cavity 12 can be designed to receive a removable, pressure-balanced cartridge insert as a radioactive substance containing liner for the cavity 12 (an example of such insert is shown in FIG. 13, to be described subsequently hereinbelow).

Extending from the cavity 12 of each embodiment is a channel 14 defined through the outlet or lower end of the body of the respective receptacle means 10. This lower end is connectible to a carrier through which a material can be flowed, which flowing material is the flow stream into which the radioactive substance is to be injected from the container 2. An example of such carrier is the flow system illustrated in FIG. 6.

The receptacle means 10 of the illustrated embodiments has an end opposite the lower end through which the channel 14 is defined. This opposite end is referred to herein as a displacement means drive end because it is the end through which a suitable drive mechanism, such as of a type subsequently described, is inserted into the receptacle means 10 for actuating the injector portion of the present invention.

The injector portion of the container 2 includes displacement means, mounted in the receptacle means 10 so that it is disposed in the radioactivity confining volume, for displacing at least a portion of the radioactive substance from the volume of the receptacle means 10 into the carrier flow line when the container 2 is connected to the carrier flow line and a radioactive substance is in the receptacle means. Thus, the present invention directly injects the radioactive substance into a moving stream of material which is flowing through the carrier flow line.

The displacement means of each of the illustrated embodiments includes a plunger member, or piston, 16 slidably disposed in the cavity 12. Each displacement means also includes a retaining member 18 connected to the body of the receptacle means 10 to limit the extent to which the plunger member 16 can slide in one direction relative to the body. The retaining member 18 has a central opening 20 defined therethrough, thus giving the retaining member 18 an annular shape. The retaining member 18 is connected near the displacement means drive end of the receptacle means 10 so that a suitable plunger drive means can communicate with the plunger member 16 through the opening 20. The retaining member 18 is releasably connected (such as by a threaded connection) to this end of the body of the receptacle means 10 on one side of the plunger member 16.

One or more end closures of the container 2 can be used for closing or capping the outlet end and/or the discharge means drive end of the receptacle means 10. Such a closure may not be needed with some embodiments or applications, or such a closure may be needed only at a job site or also, or alternatively, during transportation. One embodiment of a pair of end closures is illustrated in FIG. 1. The type of end closure shown in FIG. 1 includes a releasable closure means 22 for enclosing the outlet end of the body of the receptacle means 10. The means 22 includes an end cap 24 and clamp means 26 for clamping the end cap 24 to the body. In the illustrated embodiment the clamp means 26 is a Victaulic clamp; however, other suitable types, such as threaded or union types, can be used if the body is suitably adapted to receive such closures. The end closure of FIG. 1 also includes releasable closure means 28 for enclosing the displacement means drive end of the body of the receptacle means 10. The closure means 28 is identical to the closure means 22 in the embodiment shown in FIG. 1 so that the closure means 28 includes an end cap 30 and clamp means 32 for clamping the end cap 30 to the body of the receptacle means 10. In the illustrated embodiment the end caps 24, 30 are lined with lead to provide a protective radioactivity barrier across the respective ends of the receptacle means 10. Other types of end closures or members will be described hereinbelow with reference to FIGS. 10–14.

In the embodiment illustrated in FIG. 1, the receptacle means 10*a* more particularly includes inner means for defining the cavity 12*a* and for defining the outlet channel 14*a* extending from the cavity 12*a*. The receptacle means 10*a* also includes outer means, disposed externally of the inner means, for defining the radioactivity barrier which confines radioactivity within the cavity 12*a*.

The inner means includes an inner tubular support member 34 having an inner surface 36 defining the cavity 12*a*. A lower portion of the surface 36 is threaded as indicated by the reference numeral 38. Spaced radially outwardly from the surface 36 by an annular shoulder surface 40 is a cylindrical surface 42 having a threaded portion 44. A radial annular surface 46 extends from the perimeter of the surface 42 opposite the perimeter intersecting with the surface 40 to a cylindrical surface 48 which extends from the surface 46 to an annular end surface 50 of the support member 34. A radially extending annular surface 52 extends from the opposite end of the surface 36 to a cylindrical surface 54 having a threaded portion 56. The surface 54 terminates at an annular end surface 58 of the support member 34.

Other surfaces of the support member 34 include an outer cylindrical surface 60 from one end of which a beveled surface 62 extends outwardly and from the other end of which a beveled surface 64 extends outwardly. The beveled surface 62 extends from the surface 60 to a radial annular surface 66. The surface 66 intersects a surface 68 in which a circumferential groove 70 is defined. The surface 68 intersects a radial annular surface 72 which extends into a circumferential groove 74 receiving a sealing ring 76. The groove 74 is defined in a cylindrical surface 78 extending between the end surface 58 and the annular surface 72. The other beveled surface 64 extends from the surface 60 to a radial annular surface 80 which terminates in a cylindrical surface 82 having a circumferential groove 84 defined therein. The surface 82 intersects a radial annular surface 86 extending into a circumferential groove 88 defined in a cylindrical surface 90 intersecting the lower end surface 50. The groove 88 receives a sealing ring 92.

The upper annular surface 72 provides a shoulder used as a stop or abutment surface against which the end cap 30 is placed when it is to be held by the clamp 32. An inner surface of the end cap 30 is sealingly engaged by the seal ring 76 to prevent leakage into or out of the receptacle means 10*a* through the end cap 30. A similar sealing connection is obtained between an inner surface of the end cap 24 and the seal member 88. The end cap 24 abuts the shoulder surface 86 when the end cap 24 is held to the receptacle means 10*a* by the clamp 26.

Forming another part of the inner means of the receptacle means 10*a* of the FIG. 1 embodiment is a channel member 94 having the outlet channel 14*a* defined therein. Part of the channel 14*a* shown in FIG. 1 includes a valve seat portion 96. The channel member/valve seat means 94 is releasably connected to the tubular support member 34 by a threaded connection between a threaded surface 98 of the channel member 94 and the threaded surface portion 38 of the support member 34. This threaded connection is sealed by a sealing ring 100 disposed in a circumferential groove 102 formed in a cylindrical surface 104 of the channel member 94. The threaded surface 98 is a portion of the surface 104. The sealing ring 100 sealingly engages the surface 36 of the support member 34 when the channel member 94 is connected to the support member 34. The sealed-connection between these two members is also obtained by the engagement of a seal member 106 with the surface 42 of the support member 34. The seal member 106 is carried in a circumferential groove defined in a cylindrical surface 108 of the channel member 94. The surface 108 is radially spaced outwardly from the surface 104 by an annular surface 110.

The channel member 94 includes intersecting frustoconical surfaces 112, 114 defining the valve seat. As oriented in FIG. 1, extending below the surface 114 is a cylindrical surface 116 from which a threaded surface 118 is radially offset. The surface 118 terminates at a bottom indentation defined by a radial annular surface 120 and a cylindrical surface 122. A bottom radial annular surface 124 extends from the surface 122.

Forming still another part of the inner means of the receptacle means 10*a* shown in FIG. 1 is valve means 126 for holding the radioactive substance in the volume of the cavity 12*a* until the plunger member 16*a* is moved to displace the radioactive substance through the channel 14*a*. In the FIG. 1 embodiment the valve means 126 is disposed in the outlet channel 14*a* defined through the channel member 94. Thus, the valve means 126 is disposed in a portion of the inner means defining part of the side wall means which in turn is part of the body of the receptacle means 10*a*. The valve means 126 forms the other part of the body of the receptacle means 10*a*.

The valve means 126 of the embodiment shown in FIG. 1 includes a spherical valve member 128 and means for biasing the valve member 128 against the valve seat portion 96 of the tubular assembly comprising the support member 34 and the channel member 94. The biasing means of the FIG. 1 embodiment includes a ball retaining shaft 130 having a conical surface 132 defining a cavity in which a portion of the valve member 128 is received. The opposite end of the shaft 130 has a threaded surface 134 to which a containment ring 136 is connected after the shaft 130 has passed through a central aperture of a ball and spring retainer member 138.

The ball and spring retainer member 138 is threadedly connected to the channel member 94 by threaded engagement with the threaded surface 118 of the channel member 94. The retainer member 138 has spaced outer flange portions 140 (see FIG. 2) which are received in the depression defined by the surfaces 120, 122. A seal member 142 is held between the retainer member 138 and the channel member 94 to provide a seal therebetween.

The containment ring 136 engages a protuberant circular ridge 144 of the ball and spring retainer member 138. The containment ring 136 is held against the protuberance 144 by the force of a compression spring 146 mounted concentrically about the shaft 130. When the force of the spring 146 is overcome by a force applied to the top of the valve member 128, the spring 146 is compressed so that the shaft 130 is moved downwardly as viewed in FIG. 1. This moves the containment ring 136 away from the ball and spring retainer member 138 to allow the radioactive substance within the cavity 12*a* to flow through the channel 14*a* and out openings 148 (see FIG. 2) defined through the retainer member 138.

The outer means of the body of the receptacle means 10*a* includes an outer sleeve member 150 mounted around the tubular support member 34 in the embodiment shown in FIG. 1. The sleeve member 150 is molded or otherwise formed to fit flush against the surfaces 60, 62, 64, 66, 80 with an inner cylindrical surface 152 adjacent the surface 60 and an outer cylindrical surface 154 in alignment with the surface 68, 82 of the support member 34. The sleeve member 150 is made of any suitable radioactivity blocking material, such as lead.

In the FIG. 1 embodiment, the plunger member 16*a* is held near the top of the cavity 12*a* by the retaining member 18*a*, which retaining member 18*a* has a plurality of lugs 156 for facilitating threading and unthreading the member 18*a* to and from the threaded surface 56 of the support member 34. When the retaining member 18*a* is threaded to this surface, a lower surface 158 of the retaining member 18*a* abuts the radial annular surface 52 of the support member 34. The aperture 20a defined through the retaining member 18*a* allows the plunger drive means to connect with the plunger 16*a*, such as by means of a threaded connection with a threaded surface 160 formed into the body of the plunger member 16*a*. Seal members 162, 164 are mounted in circumferential grooves defined around the exterior of the plunger member 16*a*.

Figure 3:
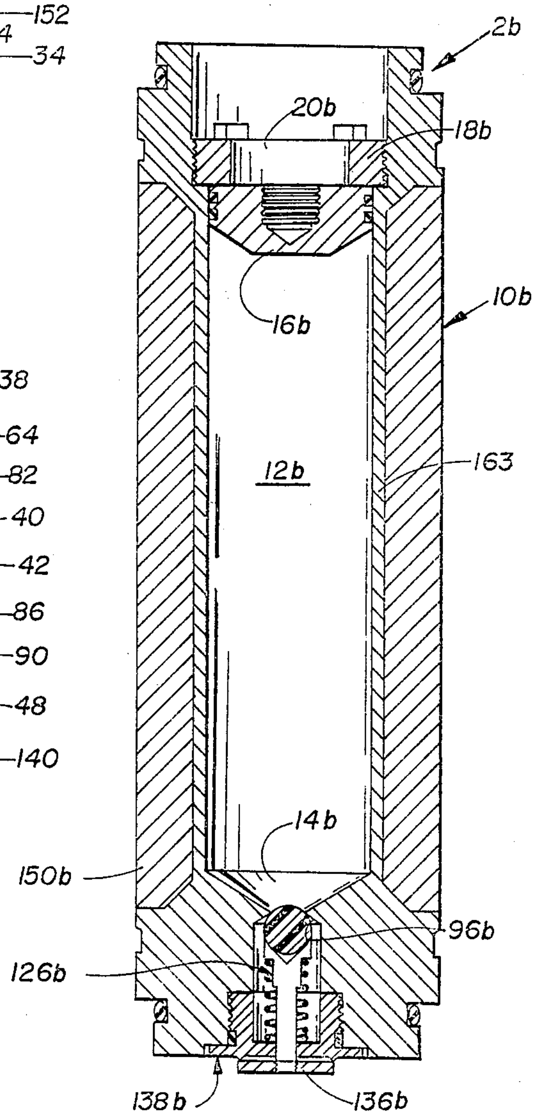
FIG. 3 is a sectional elevational view of another preferred embodiment of the container of the present invention.

The embodiment shown in FIG. 3 is similar to the embodiment shown in FIG. 1 as indicated by the use of like reference numerals but with the "b" suffix used with this second-described embodiment. This distinction between the FIG. 1 and FIG. 3 embodiments is that the FIG. 3 embodiment has an integral inner tubular support member 163 having its own integral inner surface defining the channel 14*b* and valve seat 96*b* rather than having a separable or releasable channel member as used in the FIG. 1 embodiment.

The embodiment shown in FIG. 4 is similar to the FIG. 1 embodiment except that the FIG. 4 embodiment has a channel member 165 which simply provides the channel 14*c* without a corresponding valve seat because no valve is used in the FIG. 4 embodiment. Rather, a plug 166 and a containment ring 168 are used to close openings 170 defined through the channel member 165. The openings 170 define parts of the channel 14*c* which is also defined in part by a conical surface 172 and a cylindrical surface 174 of the channel member 165.

The channel member 165 has a cylindrical outer surface 176 in which a circumferential groove 178 is defined. A seal member 180 is mounted in the groove 178 to engage the surface 36*c* of the support member 34*c* of the FIG. 4 embodiment. A radial annular surface 182 extends from the surface 176 to a surface 184. A radial annular surface 186 extends from the surface 184 to a cylindrical surface 188, which surface 188 terminates in an end surface 190 against which the containment ring 168 abuts when it is held by the plug 166.

The channel member 165 is held in the position shown in FIG. 4 relative to the support member 34*c* by an annular retainer ring 192 having a construction similar to the retainer ring 18*a* shown in FIG. 1.

The channel member 165 is shown in FIG. 4 as defining the channel 14*c* with a relatively large diameter. Illustrated in FIG. 5 is an alternative channel member 194 defining the channel 14*c* with a smaller diameter. Thus, the channel members 165, 194 illustrated in FIGS. 4 and 5 are representative of a plurality of channel members having similar outer shapes so that they can be selectably or interchangeably used with the remainder of the container 2*c* illustrated in FIG. 4. Each of these alternative channel members would have a respectively sized channel defined therein. The selected one of the channel members would be releasably connected to the support member 34*c* in the same way in which the member 165 is shown connected in FIG. 4.

Figure 10:
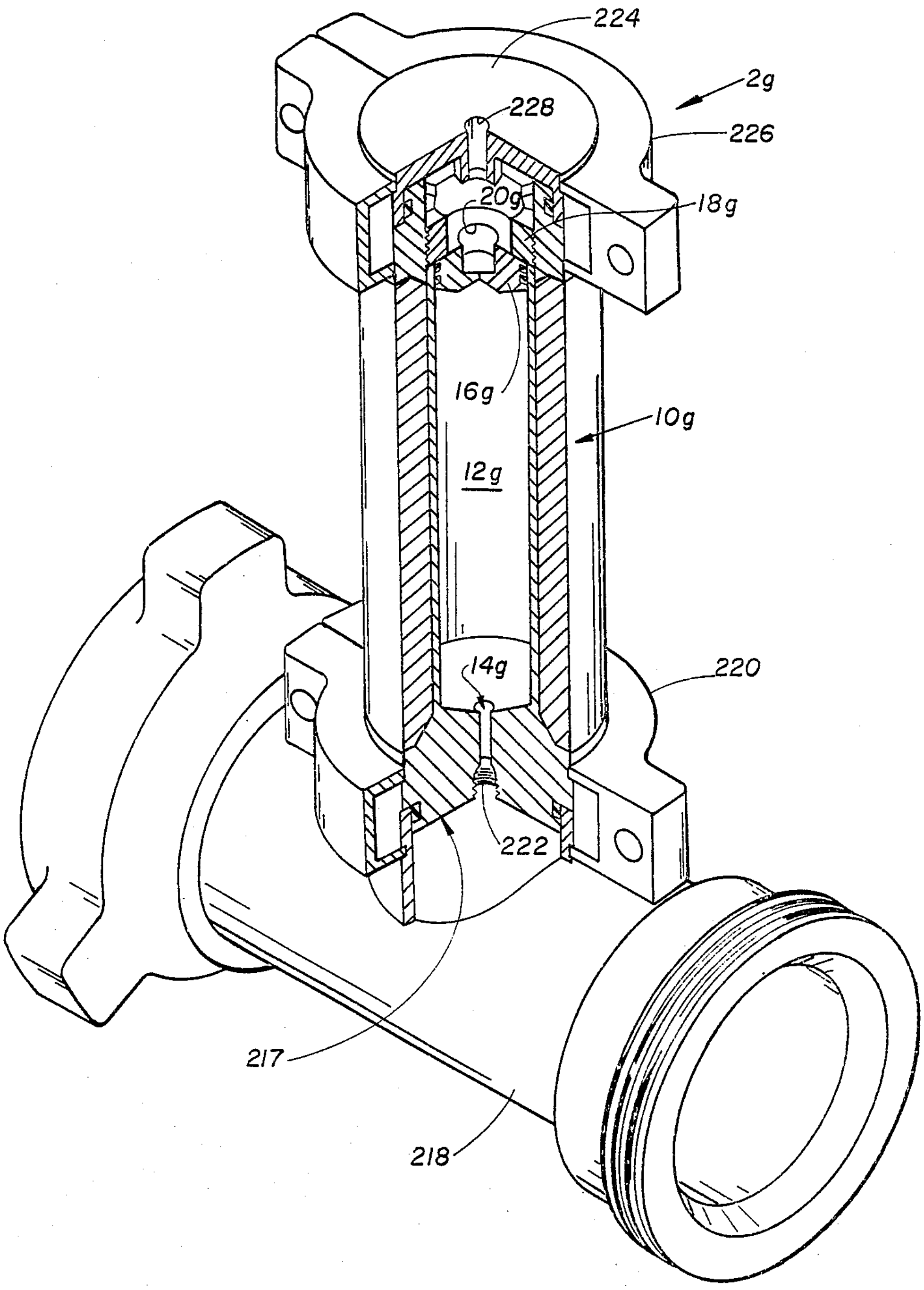
FIG. 10 is a partial sectional perspective view of another preferred embodiment of the container of the present invention, which embodiment is shown connected to a tee connector.

A contemplated preliminary production version of a low pressure embodiment of the present invention is shown in FIG. 10. This embodiment is identified by the reference numeral 2*g*. As shown by the use of like reference numerals, this embodiment includes the same general components as the previously described embodiments; this embodiment also has many of the same specific structural elements or shapes as the previously described embodiments as is apparent from the drawings. This embodiment, however, is particularly of a type having an integral inner means wherein the cavity 12*g* and the channel 14*g* are both formed by a single integral member 217 having a generally cylindrical shape with its two end portions having larger outer diameters than its central portion. A cylindrical barrier member is disposed in the recess defined along the central portion between the larger end portions. The lower end portion of this integral member 217 is shown connected to a tee connector 218 by a suitable clamp 220, such as a 3½-inch Victaulic clamp with seal. Formed in this lower end portion of the inner body is a threaded portion 222 of the axial channel 14*g*. The portion 222 can be used to receive a plug (not shown) to provide a stopper at the lower end of the channel 14*g*.

When the container 2*g* is connected to the tee connector 218 so that it is ready to use, the opposite end of the container 2*g* has a suitable injection cap 224 connected at that end by a suitable clamp 226, such as a Victaulic clamp with seal identical or similar to the clamp 220. The cap 224 has a central, axial aperture 228 through which the drive means can be communicated to the plunger 16*g* shown retained in the axial cavity 12*g* by the retaining member or collar 18*g*.

Figure 11:
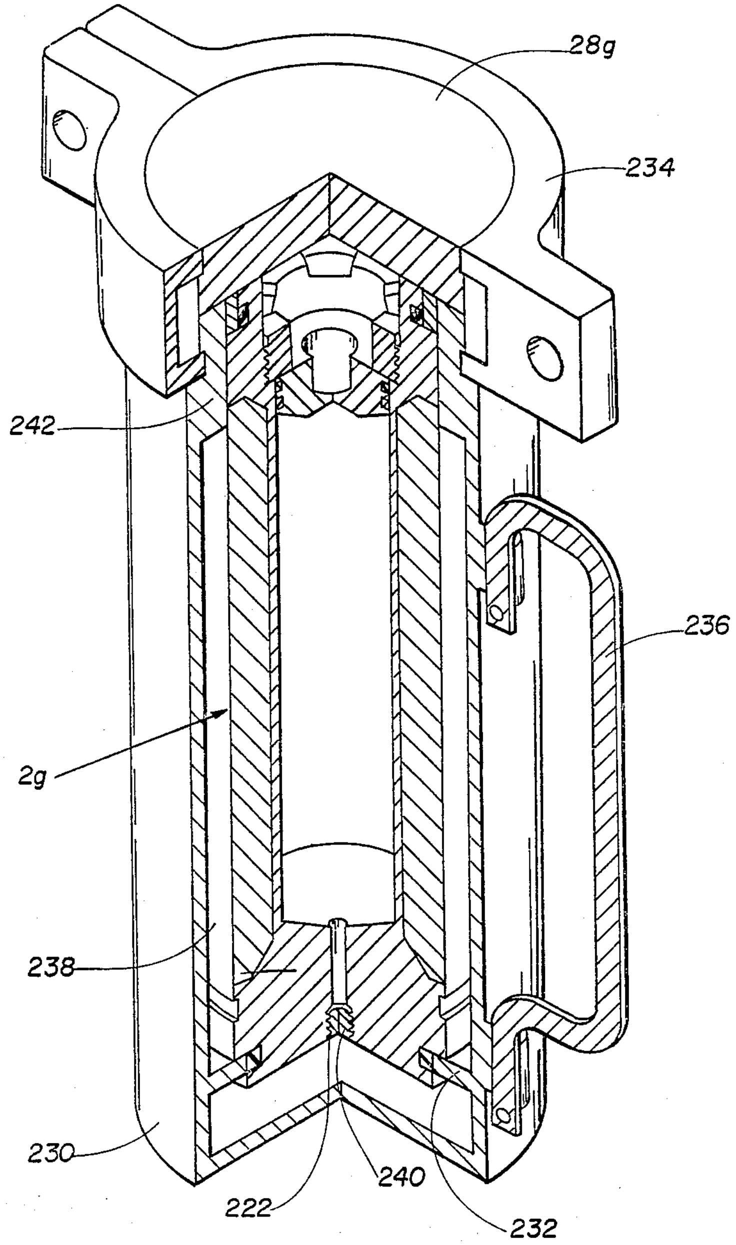
FIG. 11 is a partial sectional perspective view of the FIG. 10 embodiment mounted in an outer transportation housing.

When the embodiment shown in FIG. 10 is to be transported, the apertured injection cap 224 is replaced by a closed closure cap 28*g* as shown in FIG. 11. The closure cap 28*g* is connected to a transportation housing 230, such as a DOT (Department of Transportation) type 7A transportation container. The housing 230 has a cylindrical construction with a hollow interior near the bottom of which an annular shoulder 232 extends radially inwardly from the outer cylindrical wall of the housing 230. The shoulder 232 provides a lower support atop which the container 2*g* sits as shown in FIG. 11 when the container 2*g* is lowered down through the open top end of the housing 230 before the cap 28*g* is connected to the housing by a suitable clamp 234, such as a 4½-inch Victaulic clamp with seal. The housing 230 has a removable handle 236.

When the container 2*g* is received within the housing 230, an annulus 238 is defined between the outer surface of the container 2*g* and the inner surface of the housing 230. An absorbent material can be placed in this annular region 238 if needed.

A pipe plug 240 is shown in FIG. 11 connected into the threaded portion 222 of the channel 14*g*.

The upper end of the housing 230 has a thicker portion 242 defining a centralizing structure for the housing 230. This thicker portion 242 has an inner diameter substantially equal to the outer diameter of the container 2*g* to provide lateral support to the container 2*g* when it is received in the housing 230.

Because the embodiments of the container 2 shown in FIGS. 1–5 and 10–11 are for low pressure usage such as in an environment illustrated in FIG. 6, the selected one of the embodiments is connected through the tee connector 4 on the low pressure side of the pump 8, that is between the blending tub 6 and the pump 8. The usage illustrated in FIG. 6 requires minimal time to connect, and thus personnel will be subjected to a risk of exposure to radioactivity for a shorter time. Only minimal connect time is needed because the container 2 can be quickly connected to the tee connector 4 by any suitable known coupling, such as a Victaulic clamp connector similar to the clamps 26, 32 shown in FIG. 1 for connecting the end caps to the body of the container. By connecting the container 2 directly to the tee connector 4, the radioactive substance in the cavity 12 can be injected directly into the flow stream flowing through the tee connector 4 from the blending tub 6 to the pump 8. This obviates the need for additional pumping or conduit equipment which is required in some previous types of injection systems. Prior to being connected to the tee connector 4, the container 2 protectively houses the radioactive substance by means of the radioactivity barrier and either the valve or plug used in the particular embodiment.

Once the container 2 is mounted on the tee connector 4, the substance is injected by applying a suitable plunger drive means to the plunger member 16. By using an appropriate drive means, the radioactive substance can be injected over a wide range of injection rates. Examples of suitable drive means include a fluid pressure, a power screw, a power cylinder, or a metering pump applied or connected to the plunger member

16 through the aperture or opening 20 in the retaining member 18. Such means can also include a suitable control device such as a motor, a pump, a hand wheel crank, a metering valve or an electronic controller. Whatever drive means is used, it causes the plunger member 16 to be moved through the cavity 12, pushing the radioactive substance ahead of it through the channel 14 and into the flow stream moving through the tee connector 4.

Once the container 2 has been used, it is disconnected from the tee connector 4 and returned to the primary supplier of the radioactive substance for reloading so that the container 2 is reusable.

Although FIG. 6 represents low pressure usage of the container 2 because of its placement between the blending tub 6 and the pump 8, the container 2 can be adapted for high pressure usage such as would be needed with the flow stream discharged from the pump 8 to the well. Five such adaptations are illustrated in FIGS. 7–9 and 12–14.

Figure 7:
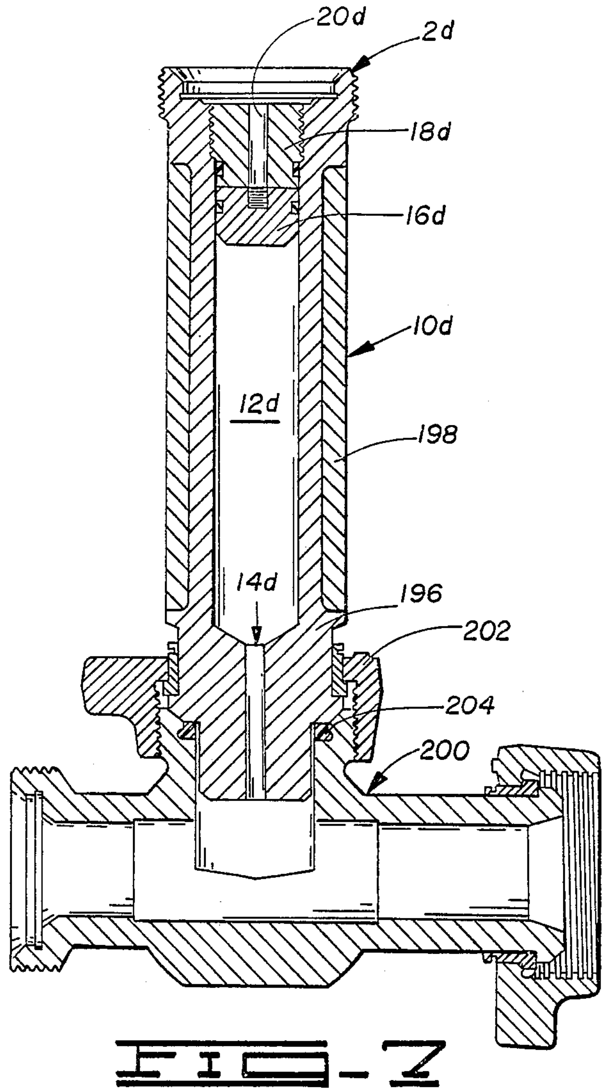
FIG. 7 is a sectional elevational view of still another preferred embodiment of the container of the present invention, which embodiment is shown connected to a tee connector.

The embodiment shown in FIG. 7 has an integral inner body 196 in which both the cavity 12*d* and the channel 14*d* are defined. An outer radioactivity barrier 198 is mounted on the inner member 196. The plunger member 16*d* is held in the cavity 12*d* by the retaining member 18*d* of a modified form compared to those previously described. This modified form is apparent in FIG. 7.

The container 2*d* is mounted on a tee connector 200 by a suitable high pressure connector such as a hammer-type WECO coupling 202. This connection is sealed by a seal ring 204.

Figure 8:
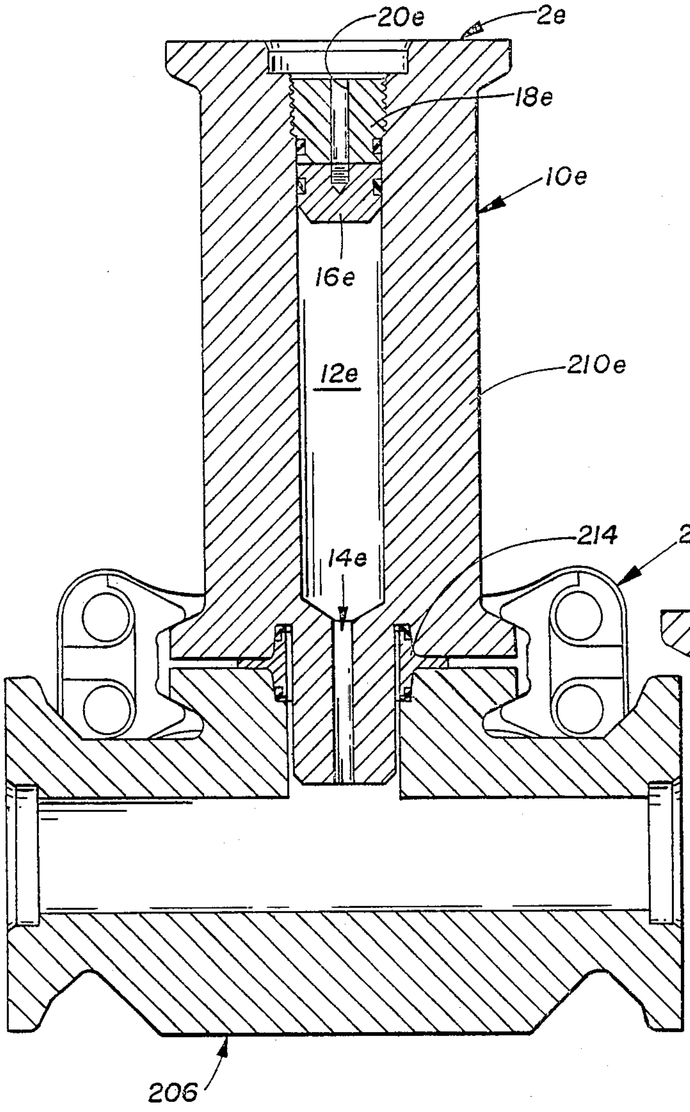
FIG. 8 is a sectional elevational view of another preferred embodiment of the container of the present invention, which embodiment is shown connected to a tee connector.
Figure 9:
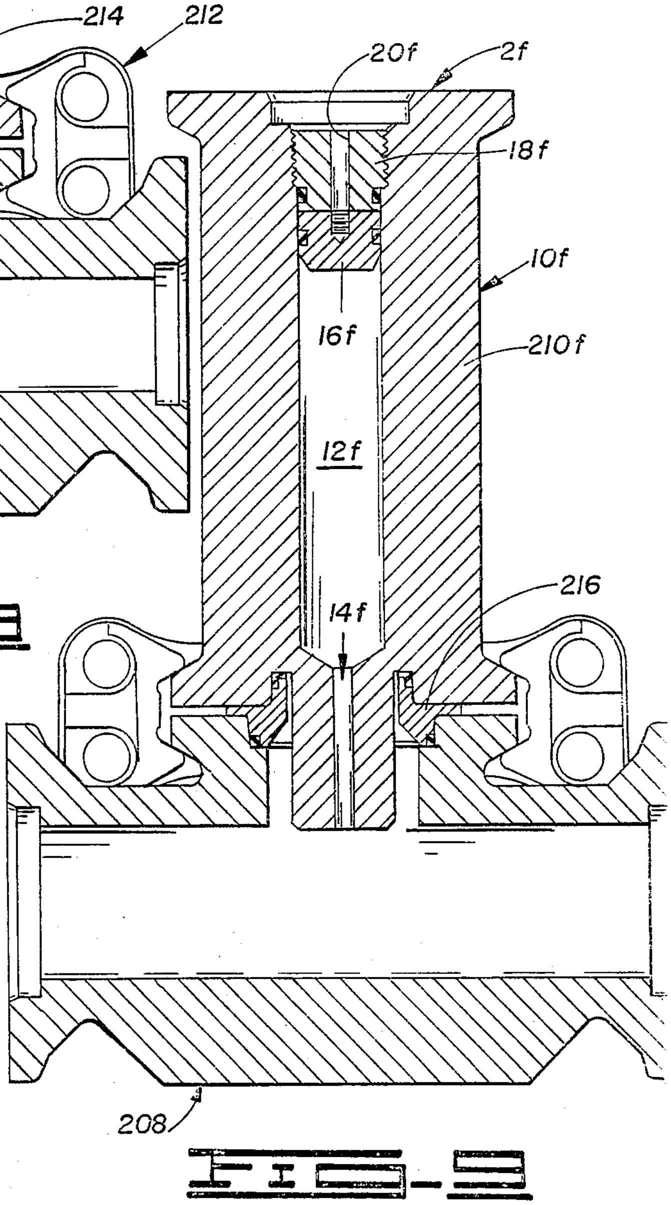
FIG. 9 is a sectional elevational view of a further preferred embodiment of the container of the present invention, which embodiment is shown connected to a tee connector.

The embodiments of the containers shown in FIGS. 8 and 9 are substantially identical except for a different type of adapter used to mate the respective container with a respective tee connector. In the FIG. 8 embodiment the carrier flow line connector is a 3-inch BIG INCH connector 206, and in the FIG. 9 embodiment the flow line connector is a 4-inch BIG INCH connector 208. The container 2*e* shown in FIG. 8 has a single cylindrical integral body 210 defining its receptacle means. The member 210 is made sufficiently thick and of a suitable substance so that the cavity 12*e*, the channel 14*e* and the radioactivity barrier are all defined by the single integral body 210. The container 2*e* is connected to the connector 206 by a suitable Gray lock 212 utilizing a suitable sealing adapter 214.

The container 2*f* shown in FIG. 9 is similar to the container 2*e*. It is likewise connected by a Gray lock to its connector 208, but with a different size of sealing adapter 216.

Figure 12:
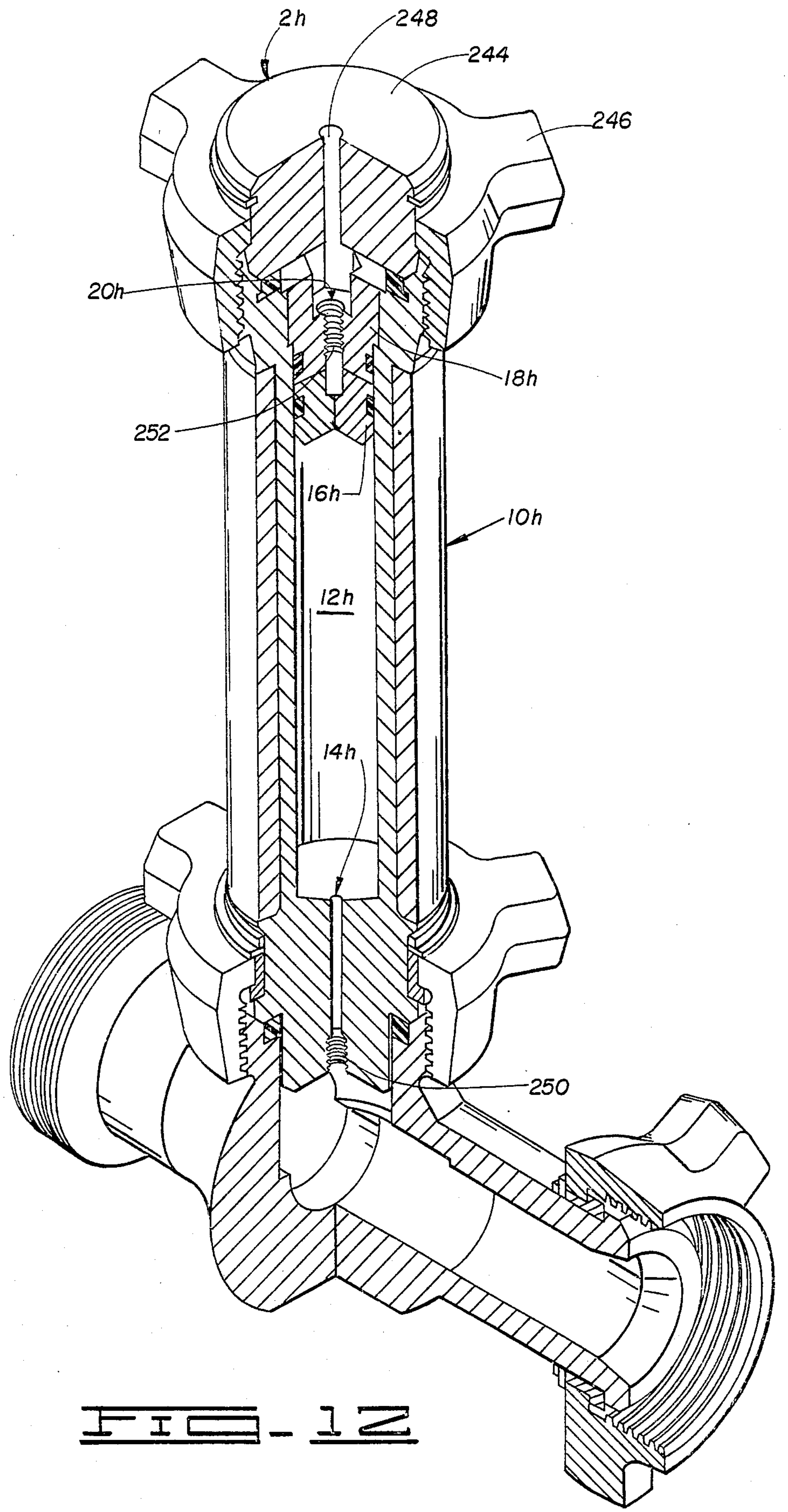
FIG. 12 is a partial sectional perspective view of a further preferred embodiment of the container of the present invention, which embodiment is shown connected to a tee connector.

The embodiment shown in FIG. 12 is somewhat identical to that shown in FIG. 7 as is apparent from the drawings. This embodiment of FIG. 12 includes the same general elements as the previously described embodiments as indicated by the use of the same reference numerals, but having the suffix "h". The embodiment shown in FIG. 12 is also shown having a displacement cap 244 connected by a wing connector 246 to the top end of the container 2*h*. The displacement cap 244 has a central, axial aperture 248 through which a suitable drive means can be communicated to the plunger member 16*h*. In other respects the embodiment shown in FIG. 12 is the same as that shown in FIG. 7 except for minor variations apparent from the drawings, such as a threaded portion 250 at the end of the channel 14*h* and a threaded portion 252 in the retainer member 18*h*.

Figure 14:
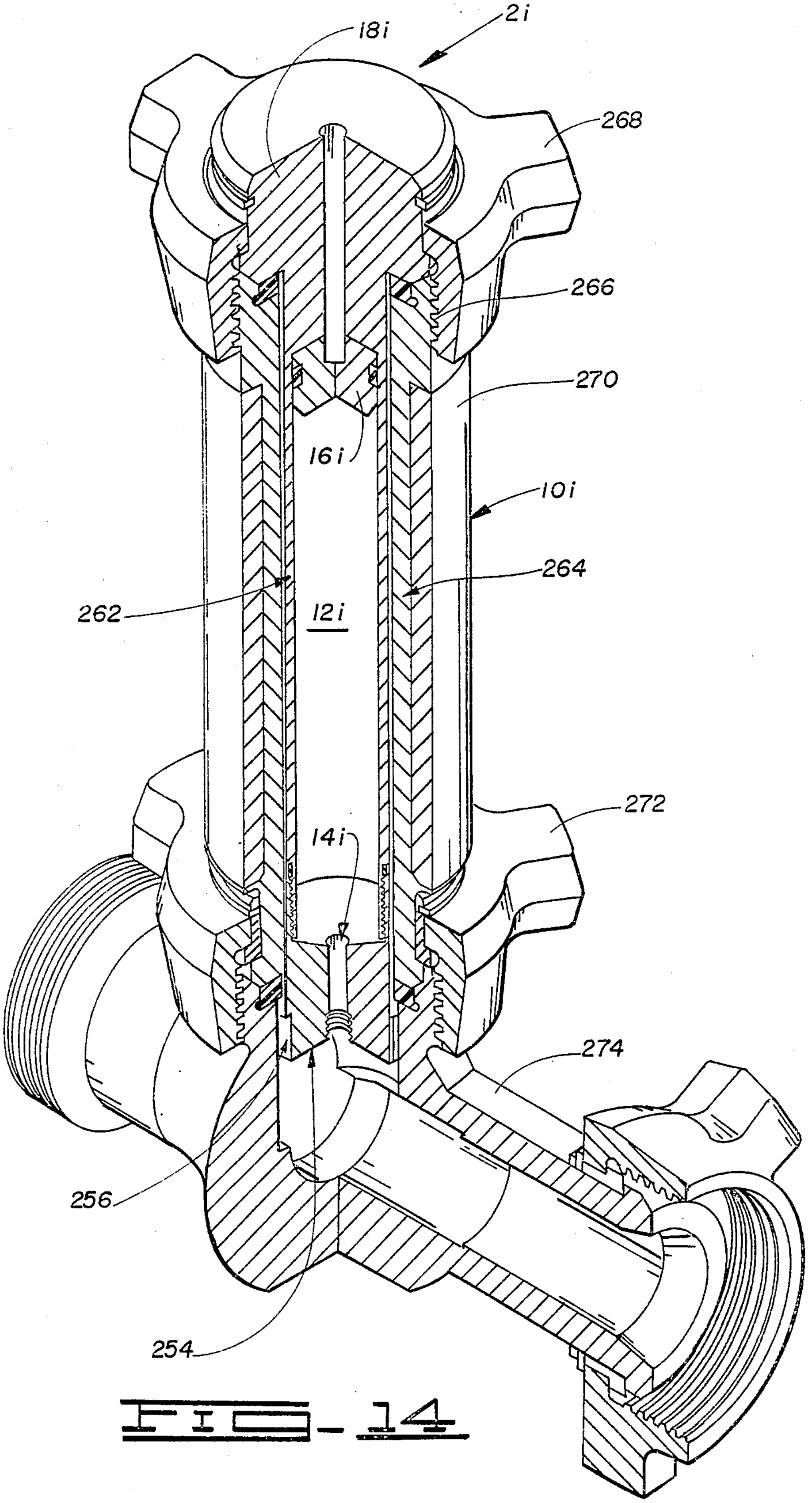
FIG. 14 is a partial sectional perspective view showing the cartridge of FIG. 13 mounted in a container similar to the one shown in FIG. 12.

An embodiment similar to the one shown in FIG. 12 but having a removable, reusable cartridge insert 254 is shown in FIG. 14. The insert 254 is shown by itself in FIG. 13. The insert 254 includes a cylindrical lower portion 256 through which the channel 14*i* is axially defined. The lower end of the channel 14*i* has a threaded portion 258 for receiving a closure plug.

Threadedly connected to the lower portion 256, in a sealed fashion including an O-ring 260, is a cylindrical upper portion 262 in which the elongated cavity 12*i* is axially defined. When connected, the portions 256, 262 form a continuous, or aligned, cylindrical outer surface. The portion 262 integrally defines the retainer member 18*i* for the plunger member 16*i* disposed in the cavity 12*i*. The plunger member 16*i* is insertable and removable by disconnecting the lower and upper portions 256, 262 and moving the plunger member 16*i* through the disconnected, open lower end of the upper portion 262. The upper portion 262 also integrally defines the displacement cap portion serving the same function as the separate displacement cap 244 shown in FIG. 12.

The insert 254 is shown in FIG. 14 assembled with a support sleeve 264. The sleeve 264 has a threaded external surface 266 to which a wing nut 268 associated with the insert 254 is connectible and from which it is disconnectable to connect and disconnect the insert 254 with the remainder of the container 2*i*. The sleeve 264 is analogous to the inner tubular members of the other described embodiments except that it is made to receive the insert 254 as opposed to itself defining the cavity 12 in which the radioactive substance is contained. A radioactivity barrier wall 270 is shown mounted on the sleeve 264. A wing nut 272 is used to connect the sleeve 264 to a suitable tee connector 274.

In the embodiments shown in FIGS. 12 and 14, the respective tee connectors can be connected to the high pressure end of a pump corresponding to the pump 8 shown in the FIG. 6 system.

As between at least certain of the different embodiments of the container 2, it is preferable to use different sizes or types of outlet ends which interface with the tee connectors so that a low pressure type, for example, cannot be inadvertently used where a high pressure type is needed.

Although the various embodiments of the present invention can be constructed of different materials and in different sizes, a few exemplary parameters will be given for purposes of illustration but without any intention of limiting the scope of the present invention. Specific embodiments of the low pressure types of container could be constructed to weigh less than approximately 50 pounds. For example, a 3/16-inch stainless steel element could be used for the inner tubular member 34 shown in FIG. 1. A $\frac{3}{4}$-inch lead sleeve could be used for the sleeve 150. These elements could be made so that the overall container 2*a* would be approximately $12\frac{3}{4}$ inches in length and contain approximately 600 cc of volume in its cavity 12*a* (it is to be noted that if more capacity is needed in any particular application, two or more of the containers 2 can be connected in series or parallel to provide the appropriate quantity).

For high pressure applications using an embodiment of the type illustrated in FIG. 7 including inner and outer members, an illustrative inner member could be approximately $\frac{1}{2}$-inch thick and an illustrative outer member could be approximately $\frac{5}{8}$-inch thick. The inner member could be of stainless steel having an inner cavity-defining surface plated with a suitable substance to reduce abrasion which could result from the high pressure injection of any abrasive substance carried in the cavity of such a container. Such a high pressure container might by approximately 20 inches long and weigh approximately 80 pounds.

Although each of the described embodiments has a generally cylindrical shape, other shapes could likely be used. Furthermore, each of the described embodiments provides a primary containment volume for holding and carrying a radioactive substance; however, each can be used with another, outer housing so that a secondary containment volume is provided, such as is illustrated in FIG. 11.

From the foregoing it is apparent that the present invention provides a radioactivity substance container which is reusable. It can be used to transport and inject liquefied or slurried radioactive substances (such as liquid, or solid, or liquid/solid, or gelled liquid radioactive tracers to be used in tagging fracturing, acidizing or cementing materials pumped into a well) in compliance with pertinent governmental regulations. The construction of the inventive container permits it to be loaded at a safe central loading facility and to be unloaded directly into a flow stream so that personnel, equipment and environmental exposures to and contaminations by radioactivity are reduced or eliminated. The container is relatively lightweight and inexpensive to manufacture and does not require implementation on a dedicated skid or trailer having its own pumps and transfer hoses, and yet the design of the invention is readily adaptable for use with either high pressure or low pressure flow streams. The radioactive substance to be injected into such flow streams can be injected at various rates of injection by using any suitable drive means which can be made to act upon the plunger contained internally within the container of the present invention.

Thus, the present invention is well adapted to carry out the objects and attain the ends and advantages mentioned above as well as those inherent therein. While preferred embodiments of the invention have been described for the purpose of this disclosure, changes in the construction and arrangement of parts can be made by those skilled in the art, which changes are encompassed within the spirit of this invention as defined by the appended claims.

What is claimed is:

1. A container for connecting to a flow line extending between a blending tub and a well head, comprising:
- receptacle means for holding a radioactive slurry;
- means, operatively connected between said receptacle means and the flow line, for connecting said receptacle means directly to the flow line; and
- displacement means, mounted in said receptacle means, for displacing at least a portion of a radioactive slurry from said receptacle means into the flow line;
- wherein said receptacle means includes:
  - a support member connectable to said connection means; and
  - a removable cartridge insert member received within and connected to said support member, said insert member having a cavity defined therein for receiving the radioactive slurry.

2. A container for a radioactive substance, comprising:
- a cartridge insert, including:
  - a cylindrical lower body including an outlet channel defined therethrough and further including a threaded surface;
  - a cylindrical upper body including a cavity defined therein and further including a threaded surface sealingly and releasably connected to said threaded surface of said lower body and said upper body also including an integral externally threaded retainer member portion disposed at the end of said upper body opposite where said threaded surface of said upper body is, said retainer member portion having an opening therethrough communicating with said cavity; and
  - a plunger member slidably disposed in said cavity of said upper body;
- a support sleeve having said cartridge insert disposed therein, said support sleeve including a threaded surface; and
- a nut threadedly engaged with said externally threaded retainer member portion of said upper body and with said threaded surface of said support sleeve.

3. A container as defined in claim 2, further comprising a radioactivity barrier wall mounted on said support sleeve.

4. A container for a radioactive substance, comprising:
- a receptable, including:
  - a unitary support member, including:
    - an inner surface defining a cavity for receiving the radioactive substance;
    - a first outer surface having an upper end and a lower end;
    - a second outer surface spaced outwardly from said first outer surface near said upper end of said first outer surface; and
    - a third outer surface spaced outwardly from said first outer surface near said lower end of said first outer surface;
    - wherein said support member has an outlet end and a drive end, said outlet end communicating with said cavity;
  - a radioactivity-blocking sleeve member mounted flush about said support member, said sleeve member including:
    - an inner surface disposed adjacent said first outer surface of said support member; and
    - an outer surface aligned with said second and third outer surfaces of said support member;
- a plunger member slidably disposed in said cavity adjacent said inner surface of said support member; and
- a retaining member threadedly connected within said support member near said drive end thereof on one side of said plunger member, said retaining member having a central opening defined therethrough, said central opening permitting a plunger drive means to be communicated with said plunger member.

5. A container for a radioactive substance, comprising:
- a receptacle, including:
  - a unitary support member, including:
    - an inner surface defining a cavity for receiving the radioactive substance;
    - a first outer surface having an upper end and a lower end;

a second outer surface spaced outwardly from said first outer surface near said upper end of said first outer surface;

a third outer surface spaced outwardly from said first outer surface near said lower end of said first outer surface; and a lower inner surface disposed below and inwardly from the inner surface of said support member, said lower inner surface defining an outlet channel formed integrally in said support member in communication with said cavity;

a radioactivity-blocking sleeve member mounted flush about said support member, said sleeve member including:

an inner surface disposed adjacent said first outer surface of said support member; and an outer surface aligned with said second and third outer surfaces of said support member; and a plunger member slidably disposed in said cavity adjacent said inner surface of said support member.

6. A container as defined in claim 5, wherein:

said lower inner surface of said support member further defines a valve seat formed integrally in said support member; and said receptacle further includes valve means, disposed in said outlet channel in releasable engagement with said valve seat, for holding radioactive substance in said cavity until said plunger member is moved to displace radioactive substance through said outlet channel and said valve means.

7. A container as defined in claim 6, wherein said valve means includes:

a valve member; and means for biasing said valve member against said valve seat, including:

a retainer member connected to said support member within said outlet channel, said retainer member including a central aperture and outlet openings defined therethrough and further including a ridge protruding from an exterior surface of said retainer member;

a retaining shaft including a first end adjacent said valve member and further including a second end extending through said central aperture of said retainer member;

a spring mounted concentrically about said retaining shaft and held thereon by and above said retainer member; and a containment member connected to said second end of said retaining shaft so that said containment member engages said ridge of said retainer member in response to biasing by said spring, said containment member thereby effectively closing said outlet openings of said retainer member.

8. A container for a radioactive substance, comprising:

a receptacle, including:

a unitary support member, including:

an inner surface defining a cavity for receiving the radioactive substance;

a first outer surface having an upper end and a lower end;

a second outer surface spaced outwardly from said first outer surface near said upper end of said first outer surface; and a third outer surface spaced outwardly from said first outer surface near said lower end of said first outer surface; and a radioactivity-blocking sleeve member mounted flush about said support member, said sleeve member including:

an inner surface disposed adjacent said first outer surface of said support member; and an outer surface aligned with said second and third outer surfaces of said support member; and a channel member including a valve seat surface and an outlet channel surface extending below said valve seat surface to an indentation defined in the bottom of said channel member, said channel member releasably connected into said support member in sealing engagement with said inner surface of said support member; said a valve disposed in said channel member, and valve including:

a valve member; and means for biasing said valve member against said valve seat of said channel member, said means for biasing including:

a retainer member including a central aperture and outlet openings defined therethrough and said retainer member further including a ridge protruding downwardly from an exterior surface of said retainer member radially outwardly from said outlet openings and said retainer member also including flanges extending radially outwardly, said retainer member releasably connected to said outlet channel surface of said channel member so that said flanges of said retainer member are received in said indentation of said channel member;

a retaining shaft including a first end adjacent said valve member and further including a second end extending through said central aperture of said retainer member;

a spring mounted concentrically about said retaining shaft and held thereon by said retainer member; and a containment member connected to said second end of said retaining shaft, said containment member engaging said ridge of said retainer member in response to biasing by said spring so that said containment member effectively closes said outlet openings of said retainer member;

a plunger member slidably disposed in said cavity adjacent said inner surface of said support member.

9. A container for a radioactive substance, comprising:

a receptacle, including:

a unitary support member, including:

an inner surface defining a cavity for receiving the radioactive substance;

a first outer surface having an upper end and a lower end;

a second outer surface spaced outwardly from said first outer surface near said upper end of said first outer surface; and a third outer surface spaced outwardly from said first outer surface near said lower end of said first outer surface;

a radioactivity-blocking sleeve member mounted flush about said support member, said sleeve member including:

an inner surface disposed adjacent said first outer surface of said support member; and an outer surface aligned with said second and third outer surfaces of said support member;

a channel member, including:

an inner surface defining a channel through said channel member;

a cylindrical first outer surface having a circumferential groove defined therein for receiving a seal member;

a radial annular second outer surface extending outwardly from said first outer surface;

a cylindrical third outer surface extending downwardly from said second outer surface;

a radial annular fourth outer surface extending inwardly from said third outer surface; and a cylindrical fifth outer surface extending downwardly from said fourth outer surface; and an annular retainer disposed adjacent said fourth and fifth outer surfaces of said channel member threadedly engaged with said support member so that said first and second outer surfaces of said channel member are held adjacent said inner surface of said support member and so that said channel of said channel member communicates with said cavity of said support member; and a plunger member slidably disposed in said cavity adjacent said inner surface of said support member.

* * * * *